Reissued Apr. 9, 1929. Re. 17,267

UNITED STATES PATENT OFFICE.

SHINJIRO HORII, OF TOKYO, JAPAN.

STENCIL SHEET.

No Drawing. Original No. 1,587,954, dated June 8, 1926, Serial No. 40,105, filed June 27, 1925. Application for reissue filed February 15, 1929. Serial No. 340,322.

My invention relates to improvements in stencil sheets of the type commonly used for autographic and typewriting duplications, consisting of a sheet of fibrous material coated or impregnated with a composition comprising esters of polysaccharides, naphthenic acid glycerides and tempering agents, such as fats, fatty acids and waxes, for the purpose of preparing the superior stencil sheets which offer a considerable resistance to atmospheric influences and give a large number of clear and sharp copies from one original.

It is well known that a solution of collodion or celluloid, combined with castor oil or other fatty oils as a tempering agent, has been used for a coating material to produce stencil sheets. Such a composition does not, however, produce superior stencil sheets, having the disadvantage of being sticky and, moreover, the coated medium is not soft enough to produce a clear writing by the use of a stylus or by the impact of the type of a writing machine.

According to the present invention the coating material of the stencil sheets consists of a solution of esters of polysaccharides, combined with naphthenic acid glycerides.

It may be noted that the naphthenic acid glycerides have high viscosity and are very stable and limpid at even very low temperatures. They are miscible with fatty oils, fats and waxes. And the naphthenic glycerides form also an emulsion with collodion or celluloid solution, which is a suitable coating material for stencil sheets.

It has been found that a composition comprising esters of polysaccharides, naphthenic acid glycerides and fatty and waxy materials (fatty oils, fats, waxes, fatty acids, etc.) is the most superior coating material for stencil sheets, which produces a coating of the desired softness but without stickiness, does not become hardened in cold weather. The stencil sheets thus obtained can be used throughout an extended period of time without any change in the coating and produce therefrom a large number of clear and sharp copies.

In carrying out the invention I coat or impregnate a sheet of fibrous material, for instance yoshino paper, with a coating solution prepared by dissolving an ester or a mixture of esters of polysaccharides, such as starch acetates, cellulose acetates, cellulose nitrates or cellulose xanthate, in suitable solvents, such as alcohol, ether or amylacetate, and adding naphthenic acid glycerides and other tempering agents, such as fatty acids, fatty oils, fats, paraffin, ceresin and other waxes. Or, this composition may be added into the paper stuff in a mixing hollander during the paper making operation.

The proportions of the ingredients of the composition may vary according to several circumstances. The following is an example:

| | Parts by weight. |
|---|---|
| Pyroxylin | 5 |
| Naphthenic acid glycerides | 15 |
| Ceresin | 5 |
| Stearine | 5 |
| Oleine | 5 |
| Methyl alcohol | 15 |
| Acetone | 15 |
| Amyl acetate | 50 |
| Petroleum benzine | 20 |

As stated, the coated sheets remain throughout an extended period of time practically unchanged without the drawback of becoming sticky or friable. By the use of a stylus or the blow of the type of a typewriter, without necessity of moistening the sheets with water or moistening solutions, clear characters may be easily produced thereon.

What I claim is:

1. A stencil sheet comprising a base of fibrous material impregnated with a composition including an ester of polysaccharides, and naphthenic acid glycerides.

2. A stencil sheet comprising a base of fibrous material impregnated with a composition including a mixture of various esters of polysaccharides, and naphthenic acid glycerides.

3. A stencil sheet comprising a base of fibrous material impregnated with a composition including an ester of polysaccharides, naphthenic acid glycerides, and tempering agents.

4. A stencil sheet comprising a base of fibrous material impregnated with a composition including a mixture of various esters of polysaccharides, naphthenic acid glycerides, and tempering agents.

5. A stencil sheet comprising a base of fibrous material impregnated with a composition including a solution of an ester of polysaccharides, and naphthenic acid glycerides.

6. A stencil sheet comprising a base of fibrous material impregnated with a composition including a solution of an ester of polysaccharides, naphthenic acid glycerides, and tempering agents.

7. A stencil sheet comprising a base of fibrous material impregnated with a composition including an ester of polysaccharides, naphthenic acid glycerides, and fatty materials.

8. A stencil sheet comprising a base of fibrous material impregnated with a composition including a solution of esters of polysaccharides, naphthenic acid glycerides, and fatty materials.

9. A stencil sheet comprising a base of fibrous material impregnated with a composition including an ester of polysaccharides, naphthenic acid glycerides, and fatty and waxy materials.

10. A stencil sheet comprising a base of fibrous material impregnated with a composition including a solution of esters of polysaccharides, naphthenic acid glycerides, and fatty and waxy materials.

In testimony whereof I affix my signature.

SHINJIRO HORII.